Figure 1:
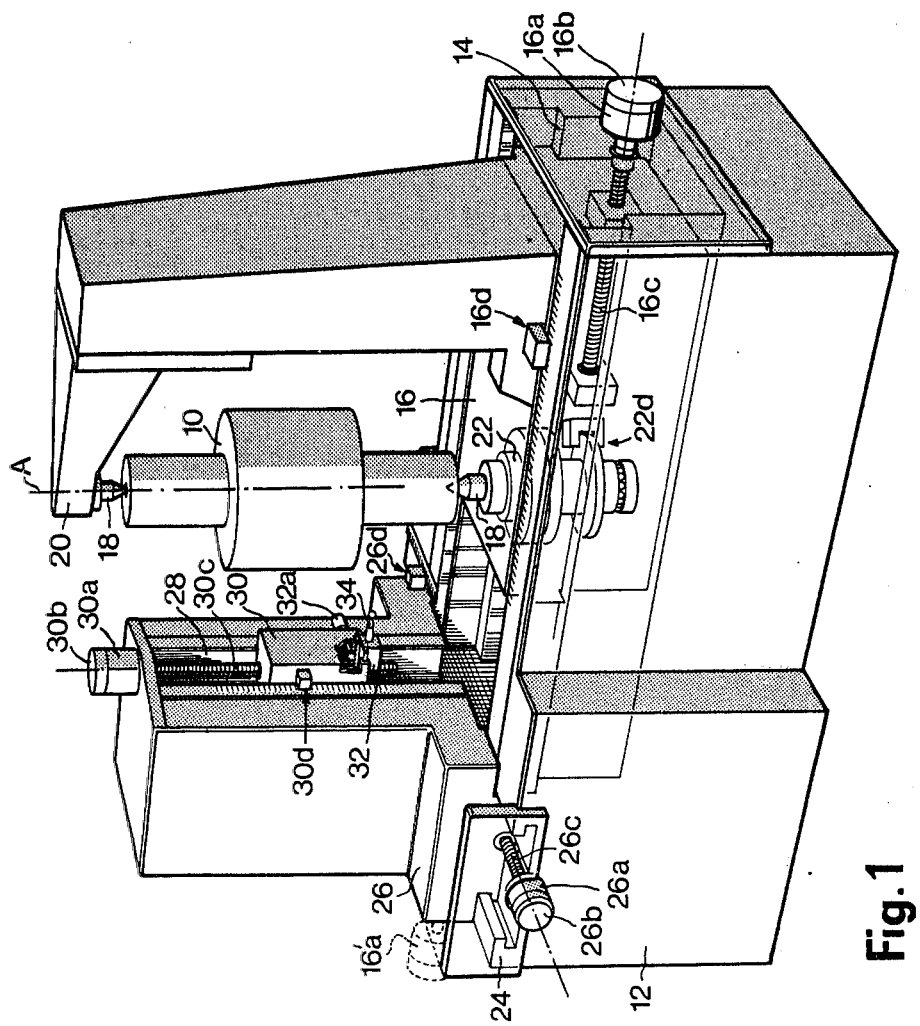

United States Patent [19]

Sterki et al.

[11] 4,297,788
[45] Nov. 3, 1981

[54] GEAR TESTING MACHINE

[75] Inventors: Armin Sterki, Uetikon; Gerd R. Sommer, Dietikon, both of Switzerland

[73] Assignee: Maag- Zahnräder & Maschinen AG, Zürich, Switzerland

[21] Appl. No.: 111,769

[22] Filed: Jan. 14, 1980

[30] Foreign Application Priority Data

Jan. 19, 1979 [CH] Switzerland .......................... 548/79

[51] Int. Cl.³ .......................... G01B 5/20; G01B 7/28
[52] U.S. Cl. .......................... 33/179.5 R; 33/179.5 D
[58] Field of Search .................. 33/179.5 R, 179.5 D; 33/174 PC, 1 M, 147 M, 169 R

[56] References Cited

U.S. PATENT DOCUMENTS

| | | | |
|---|---|---|---|
| 3,071,862 | 1/1963 | Daniel et al. | 33/179.5 D |
| 3,631,603 | 1/1972 | Munro | 33/179.5 R |
| 3,741,659 | 6/1973 | Jones, Jr. | 356/357 |
| 3,950,858 | 4/1976 | Donner | 33/179.5 D |
| 4,062,125 | 12/1977 | Maag | 33/179.5 D |
| 4,166,323 | 9/1979 | Maag | 33/179.5 R |

FOREIGN PATENT DOCUMENTS

| | | | |
|---|---|---|---|
| 2064277 | 12/1970 | Fed. Rep. of Germany | 33/179.5 R |
| 2333502 | 1/1975 | Fed. Rep. of Germany | 33/179.5 R |
| 2364916 | 7/1975 | Fed. Rep. of Germany | 33/179.5 R |
| 1457572 | 11/1966 | France | 33/179.5 R |

*Primary Examiner*—Willis Little
*Attorney, Agent, or Firm*—Werner W. Kleeman

[57] ABSTRACT

A gear testing machine tests toothing characteristics such as tooth profile, tooth pitch or tooth helix angle and records deviations between desired and actual values on a test piece (10) which may be a gear, a worm etc. A radial carriage (16) is mounted on radial guideways (14) and is displaceable by means of a radial drive comprising a servomotor (16a), a tachogenerator (16b) and a position transducer (16d). In addition, a tangential carriage (26) and an axial carriage (30) are controllably displaceable by respective drives analogous to the radial carriage drive. The various drives are further connected to position regulators. The desired/actual deviations can be determined from a signal of a sensor (34) and correction values of the corresponding position regulators. At least one of the drives has a second closed loop control circuit comprising the servomotor (22a, 26a, 30a) of the respective drive and its associated position transducer (22d, 26d, 30d) and actual position values determined by another of said drives are inputted to said second circuit as a regulating variable therefore.

6 Claims, 5 Drawing Figures

GEAR TESTING MACHINE

The invention relates to a gear testing machine with drives for relative movements between a gear to be tested and a sensor connected to an electronic control and evaluation device.

In known gear testing machines of the category (U.S. Pat. No. 3,741,659) and the brochure "microlog-50" of the Fellows Gear Shaper Company, Springfield Windsor, Vt. U.S.A.), there is a rotary drive for relative movements about the axis of the gear, an axial drive for rectilinear relative movements in the direction of the axis to the gear and a tangential drive for relative rectilinear movements in the direction of a tangent to the pitch circle of the gear, each of said drives comprising a servomotor and a tachogenerator providing elements of a closed loop control system, and also a position transducer and an electronic correction circuit which compares with each other the actual position values determined by the position transducers and corrects the test signals emitted by the sensor in conformity with the position errors thereby determined. In the case of a tooth profile test for example, the desired involute profile of the gear to be tested is stored in the electronic control and evaluation device and is translated thereby into a theoretical distance along which the sensor must be moved in order to maintain a prescribed interval between itself and the respective tooth flank to be tested with the rotary drive and tangential drive running. The electronic control and evaluation device then generates the signals which are required in order to produce correspondingly co-ordinated rotations of the gear about its axis and tangential displacements of a carriage carrying the sensor. Simultaneously the control and evaluation device evaluates electrical signals which are generated by the sensor and state its position with reference to the tooth flank to be measured as a deviation from the prescribed distance of the sensor from said tooth flank. The signals emitted by the position transducers of the rotary drive and of the tangential drive are continuously compared by the control and evaluation device with the theoretical angular position of the gear to be tested and with the theoretical position of the tangential carriage carrying the sensor and every deviation of the actual from the theoretical position causes corrections of the signals emitted by the sensor with the result that error signals are recorded which, having been made largely free of errors of the testing machine, state the inaccuracies of the tooth flank tested.

In these known gear testing machines a considerable outlay is required for data memory and computer in order to store and mutually correlate the described data. The outlay is particularly considerable if, instead of an evaluation after completion of the relevant measurements (off line method) an evaluation during the current test process is required to be possible (on line method).

It is consequently the underlying aim of the invention to develop a gear testing machine of the category initially described in such a way that tests of tooth flanks, particularly profile, tooth helix angle and tooth pitch tests, can be performed with an economical outlay on data memories and computing units and can be evaluated during the course of a test.

According to the invention, there is provided a gear testing machine with drive means for relative movements between a toothed gear to be tested and a sensor connected to an electronic control and evaluation device, said means comprising a rotary drive for relative rotational movements about the axis of the gear, an axial drive for rectilinear relative movements in the direction of the axis of the gear and a tangential drive for relative rectilinear movements in the direction of a tangent to the pitch circle of the gear, each of said drives comprising a servomotor and a tachogenerator providing elements of a closed loop control system, and also a position transducer, the testing machine further comprising an electronic correction circuit which compares with each other the actual position values determined by the position transducers and corrects the test signals emitted by the sensor in conformity with the position errors thereby ascertained, at least one of the said further drives comprising a second closed loop control circuit which includes the servomotor of the relevant drive and the associated position transducer and to which actual position values determined by another of the said drives are arranged to be supplied as a regulating variable.

For tooth profile tests the rotary drive is preferably controlled independently of the remaining drives and the actual position value of the rotary drive, after multiplication by a factor representative of the pitch circle radius, can constitute the regulating variable of the second closed loop control system of the tangential drive.

For pitch tests on toothed worms the rotary drive is likewise preferably controlled independently of the remaining drives and the actual position value of the rotary drive, after multiplication by a factor representative of the pitch of the tooth worm, can constitute the regulating variable of the second closed loop control system of the axial drive.

For tooth helix angle tests on the other hand, the axial drive is preferably controlled independently of the remaining drives and the actual position value of the axial drive, after multiplication by a factor representative of the tangent of the tooth helix angle, constitutes the regulating variable of the second closed loop control system of the rotary drive.

In all the cases described it is advantageous if the rotary drive likewise comprises a second closed loop control system which contains the servo motor of the rotary drive and the associated position transducer.

The described embodiments of the invention are conveniently combined in a gear testing machine which can be adjusted selectively for tooth profile tests, pitch tests or tooth helix angle tests. In each case a selected one of the drives, which can be actuated by a pulse generator, assumes control and makes another of the described drives dependent upon itself in a simple manner with a small outlay, namely by multiplication by a factor adjustable once for all for any particular test. No harm need result if the test is performed before the dependent drive has attained its position corresponding to the position of the controlling drive, because actual deviations from desired positions of the dependent drive are subtracted from the signal which indicates the deflection of the sensor for the relevant test.

Figure 2:
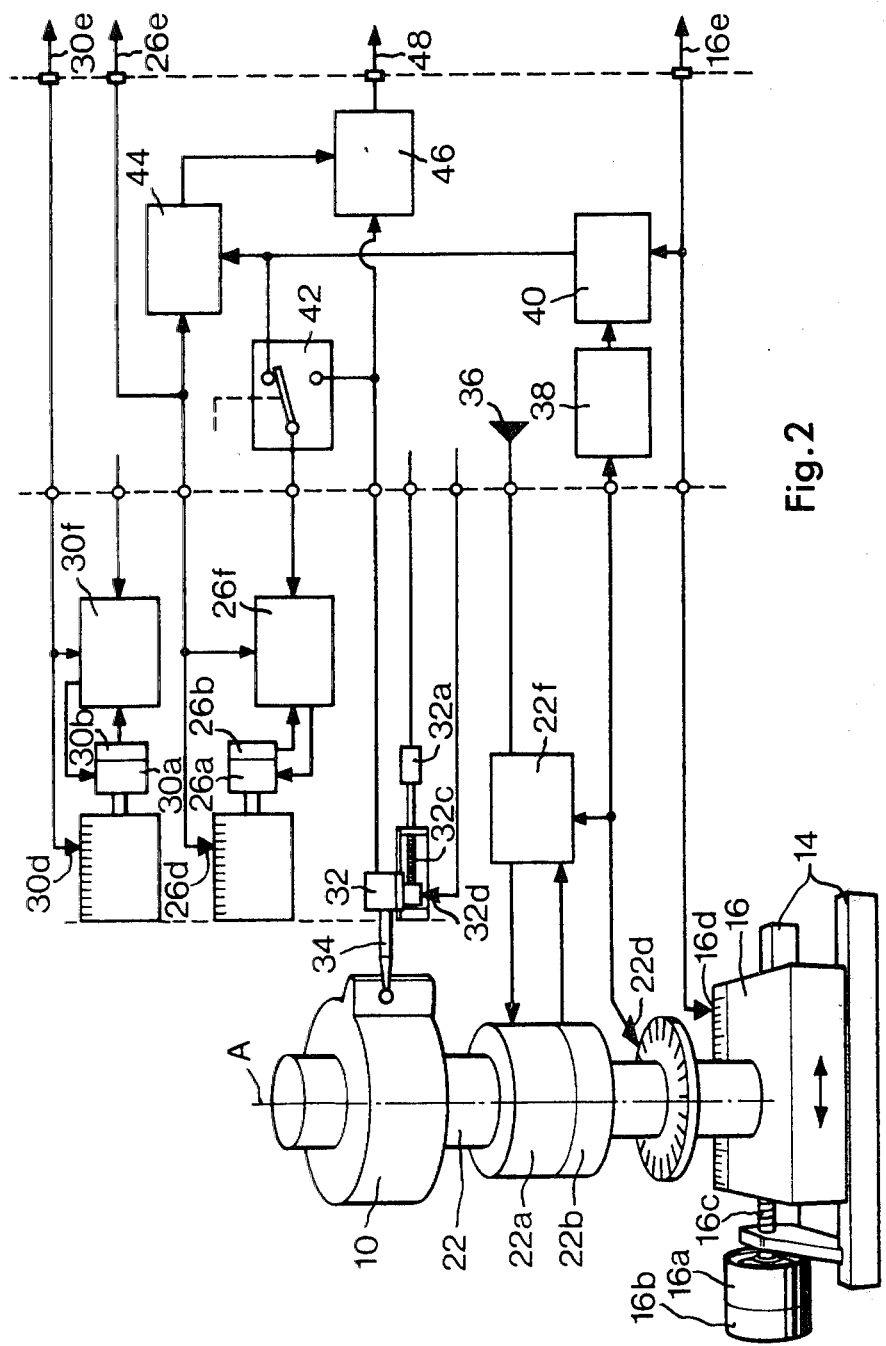
Figure 3:
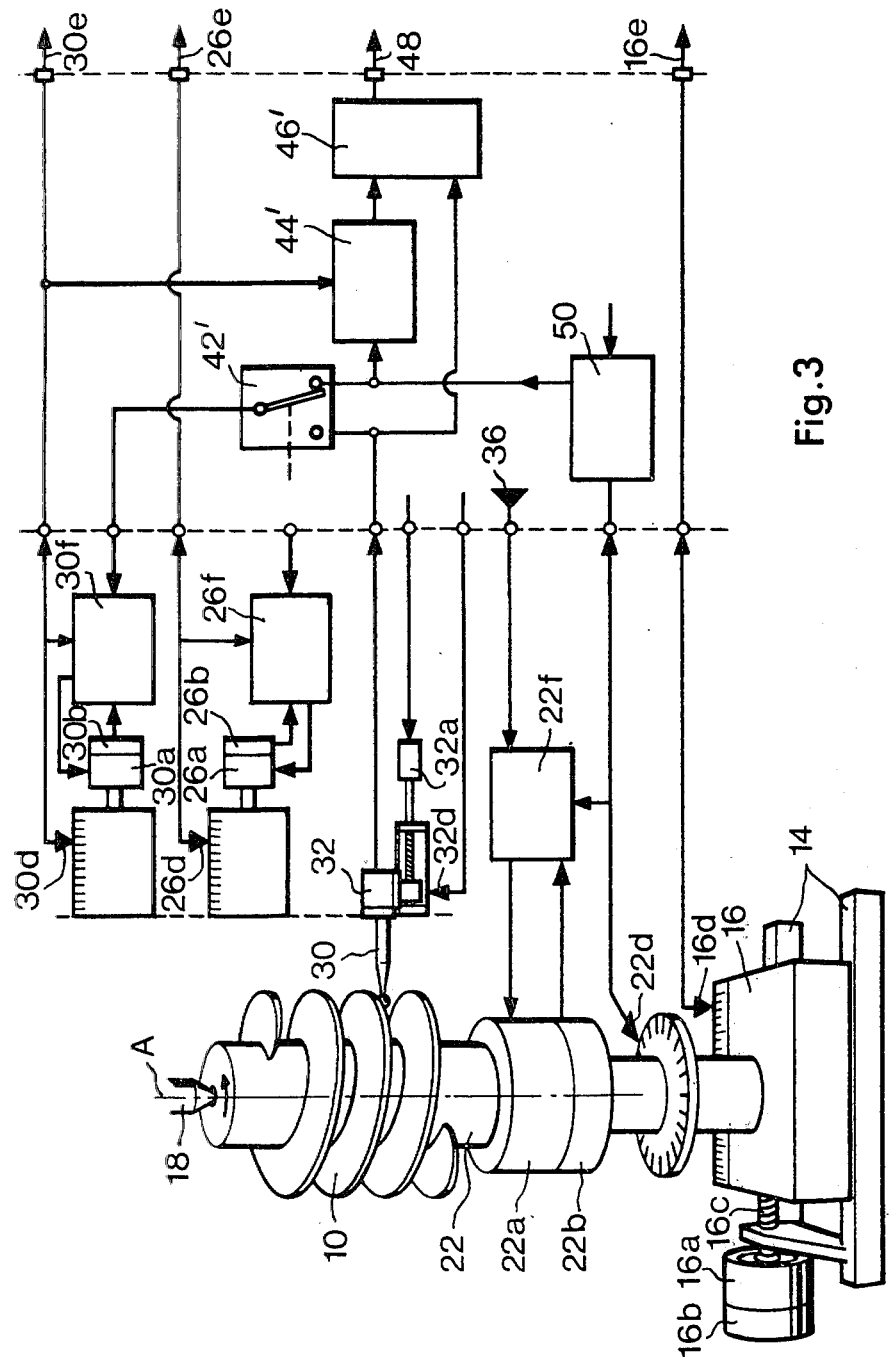
Figure 4:
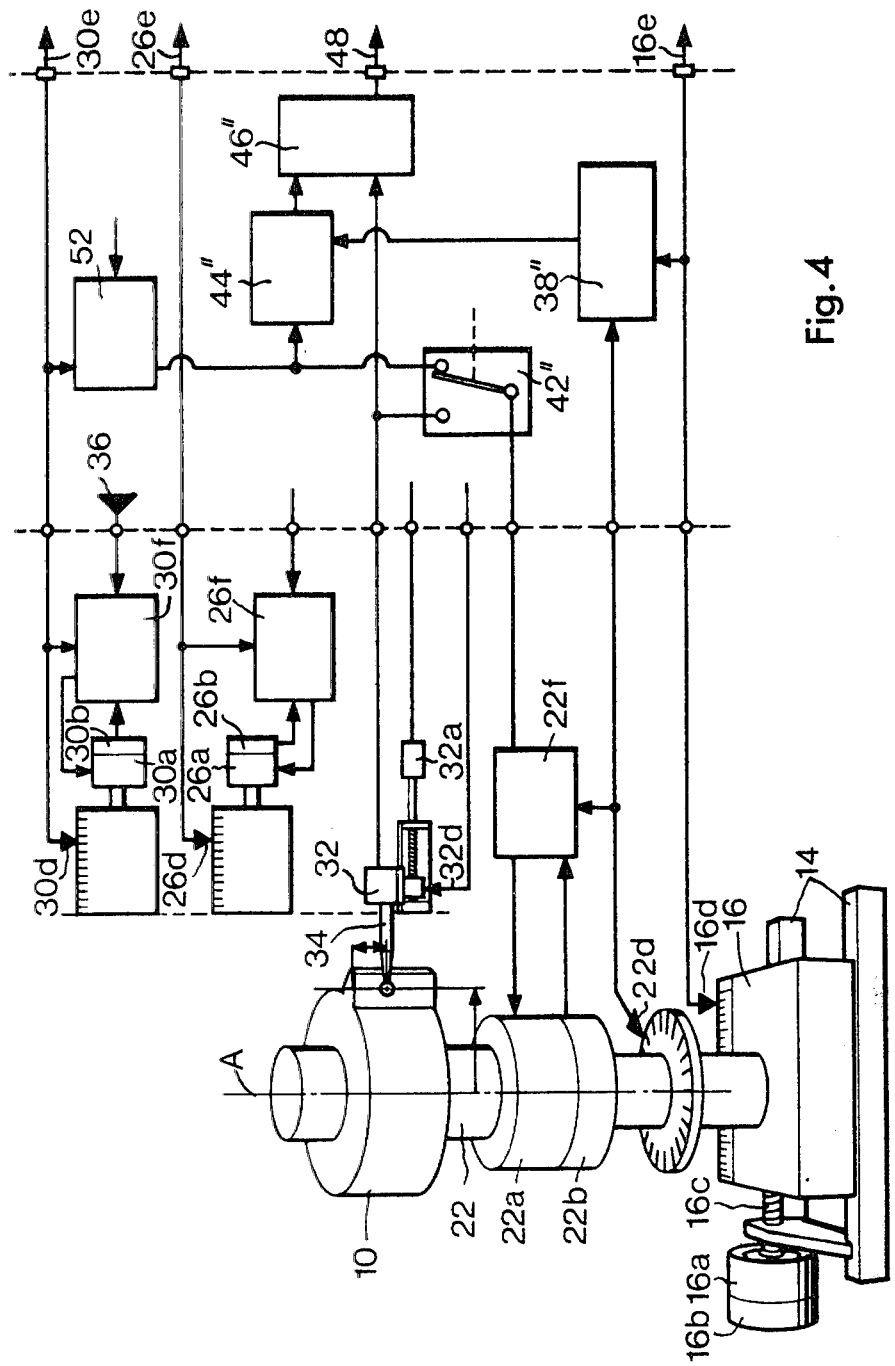
Figure 5:
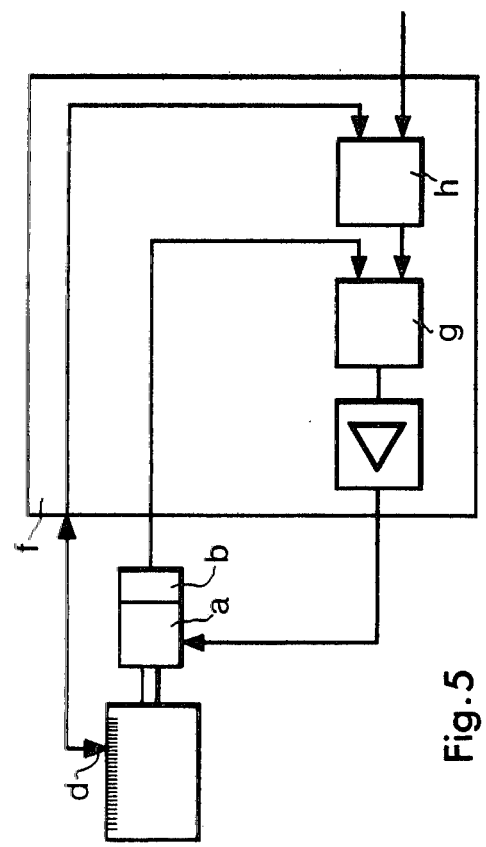

An embodiment of the invention will be described in further detail with reference to the accompanying schematic drawings, wherein:

FIG. 1 shows an isometric view of a gear testing machine according to the invention, FIG. 2 shows a block circuit diagram of the circuit of the machine of FIG. 1 for tooth profile tests associated with the machine, FIG. 3 shows a block circuit diagram of the circuit for pitch tests on toothed worms associated with the same machine, FIG. 4 shows a block circuit diagram of the circuit for tooth helix angle tests associated with the same machine, and FIG. 5 shows details of a form of position regulator used in several instances in the various block circuit diagrams.

The gear testing machine illustrated has the function to test toothing characteristics such as the tooth profile, the tooth pitch or the tooth bevel on a test piece 10, which may be a gear, a worm or the like, and to record actual deviations from desired values.

The gear testing machine has a machine bed 12 with a radial guideway 14, which is so called because it extends radially with reference to the axis A of the test piece 10. A radial carriage 16 is guided in the radial guideway 14 and displaceable by means of a radial drive. In the following, the defining term "radial" distinguishes the radial carriage 16 and the radial drive and its components from other carriages, their drives and components. The radial drive comprises a servomotor with connected tachogenerator, both of conventional construction, which are designated hereinbelow as the radial servomotor 16a and radial tachogenerator 16b for the reason given. The radial servomotor 16a drives the radial carriage 16 through a radial spindle 16c; the position of the radial carriage 16 is indicated by a radial position transducer 16d, which is likewise of conventional construction and in the example illustrated comprises a graduated scale arranged along the radial guideway 14 and a reading head secured to the radial carriage 16, and according to FIGS. 2, 3 and 4 is connected to a radial position indicating means 16e not shown in detail.

The test piece 10 is maintained on the radial carriage 16 between centres 18. The upper centre 18 is mounted on a counter bracket 20 which is in turn secured on the radial carriage 16. The lower centre 18 is attached to a turntable 22 which is drivable in rotation by a rotary servomotor 22a, and the test piece is held so as to rotate rigidly with said turntable. A rotary tachogenerator 22b and a rotary position transducer 22d are associated with the rotary servomotor 22a. These again comprise a servomotor, tachogenerator and position transducer of conventional construction, in the following the defining term "rotary" distinguishing them from other components of the same type. A rotary position regulator 22f is further associated with the turntable 22 according to FIGS. 2, 3 and 4.

The machine bed 12 also has a tangential guideway 24, which is so called because it extends parallel to a tangent to the pitch circle of the test piece 10. In the tangential guideway 24 there is guided a tangential carriage 26 which is displaceable in the tangential guideway 24 through a tangential spindle 26c by means of a tangential servomotor 26a with connected tangential tachogenerator 26b. A tangential position transducer 26d, a tangential position indicating means 26e and a tangential position regulator 26f are also associated with the tangential carriage 26.

An axial guideway 28, which extends parallel to the axis A of the test piece 10 maintained between the centres 18, is provided on the tangential carriage 26. An axial carriage 30 is guided in the axial guideway 28 and is displaceable through an axial spindle 30c by means of an axial servomotor 30a with connected axial tachogenerator 30b. An axial position transducer 30d, an axial position indicating means 30e and an axial position regulator 30f are also associated with the axial carriage 30.

A sensor carriage 32 is guided on the axial carriage 30 adjustably at a right-angle to the tangential guideway 24 and to the axial guideway 28, i.e. at a right-angle to the axis A, and is drivable by means of a sensor carriage motor 32a through a sensor carriage rack (FIG. 1) or sensor carriage spindle 32c (FIGS. 2, 3 and 4). A sensor carriage position transducer 32d is also associated with the sensor carriage 32. A sensor 34, which when deflected from its rest position generates signals in known manner, is mounted pivotably on the sensor carriage 32.

As FIG. 1 shows, the gear testing machine can therefore be adjusted to a specific pitch circle radius of the test piece 10 by displacing the radial carriage 16; this adjustment can be recorded with the radial position indicating means 16e. A generating or rolling movement can thereupon be generated between the test piece 10 and the sensor 34, in which the test piece 10 executes the rotational component of said generating movement by being rotated with the turntable 22 above its axis A while the sensor 34 executes the translational component of the generating movement, in that the tangential carriage 26 is displaced along the tangential guideway 24. Alternatively the sensor 34 may be moved parallel to the axis A by displacing the axial carriage 30 along the axial guideway 28.

The movements referred to may be divided differently if this appears convenient from the standpoint of the size of the test piece 10 or for other reasons. Thus for example, the turntable 22 may be mounted at a fixed position on the machine bed 12; in this case it is necessary for the tangential carriage 26 to be adjustable to the required pitch circle radius, e.g. in that it is arranged together with the tangential guideway 24 on a radial carriage. It would then be necessary for a radial servomotor 16'a together with its other related components to be associated with said radial carriage, as indicated by broken lines on the left-hand side in FIG. 1.

Each of the position regulators mentioned, irrespectively whether it is associated with the turntable 22, with the tangential carriage 26 or with the axial carriage 30, may have the general form of construction illustrated in FIG. 5, for which reason the position regulator is generally designated only with the letter f in FIG. 5 and the components associated with it are likewise designated only by the letters hitherto used without associated numerals. Thus a servomotor a is shown, which receives signals from the position regulator f and is connected to a tachogenerator b, which delivers signals to a speed regulator g within the position regulator f. The associated position transducer d is connected to a travel regulator h within the position regulator f. Each position regulator f is thus a component of two closed loop control systems, namely a speed closed loop control system and a position closed loop control system, of which the latter receives as a regulating or correcting variable the actual position value of one of those drives which is independent of the relevant position regulator f, as is clear from the description hereinbelow of details of FIG. 2 on the one hand, FIG. 3 on the other hand and lastly of FIG. 4.

For tests of the tooth profile of the test piece 10, as indicated in FIG. 2, a pulse generator 36 actuates the turntable 22, so that the latter assumes control. The angular position of the turntable 22 with reference to a specific zero position determined by the rotary position regulator 22f is converted into the arc measurement by an arc measurement converter 38 and converted by tangential position computer 40 by multiplication by the adjusted pitch circle radius into a desired position which the tangential carriage 26 ought to occupy if a generating movement free of machine errors occurred. The signal delivered by the tangential position computer 40 is fed firstly through a selector switch 42 as a regulating variable to the tangential position regulator 26f and secondly to a correction signal computer 44. The correction signal computer 44 also receives a signal corresponding to the actual position of the tangential carriage 26 and forms by subtraction of the signals fed to it a correction signal which is fed to an error computer 46. The error computer 46 also receives from the sensor 34 a signal which corresponds to its deviation. Since said deviation is a function of machine errors on the one hand and of the error of the tooth profile at the point tested on the other hand, the error computer 46 subtracts the two signals fed to it from each other in order to determine the actual error of the tooth system. This error is recorded by an error recorder 48, namely as a function of the actual position of the tangential carriage 26, which is recorded by the tangential position indicating means 26e, whilst simultaneously the position of the axial carriage 30, which remains unchanged during the tooth profile test, is recorded by the axial position indicating means 30e.

If the test piece 10 is a toothed worm, the pitch curve of which is required to be tested, then the turntable 22 is still controlled by the pulse generator 36. The signal of the rotary position transducer 22d is converted according to FIG. 3 by a pitch converter 50 by multiplication by a desired pitch into an actual position of the axial carriage 30. The signal of the pitch converter 50 is fed firstly through a selector switch 42' as a regulating variable to the axial position regulator 30f and secondly to a correction signal computer 44'. The correction signal computer 44' also receives a signal indicating the actual position of the axial carriage 30 from the axial position transducer 30d. By subtracting the two signals fed to it the correction signal computer 44' forms a correction signal which is fed to an error computer 46'. The error computer 46' also receives from the sensor 34 a signal stating its deviation and determines by subtraction of the two signals the pitch error which is in turn recorded by the error recorder 48 as a function of the axial position.

When testing a tooth helix of the test piece 10, the pulse generator 36 controls the axial carriage 30, so that the latter provides the controlling movement instead of the turntable 22. The signals of the axial position transducer 30d are firstly recorded by the axial position recorder 30e and secondly converted in a rotary angle converter 52 by multiplication by the tangent of the desired helix angle of the test piece 10 into a rotary angle signal, which is fed firstly through a selector switch 42'' as a regulating variable to the rotary position regulator 22f and secondly to a correction signal computer 44''. The correction signal computer 44'' receives as second signal a signal originating from the rotary position transducer 22d and arc measurement computer 38'' as to the actual position of the turntable 22. From the two signals fed to it the correction signal computer 44'' forms a correction signal which it delivers to an error computer 46''. The error computer 46'' in turn receives as second signal a signal emitted by the sensor 34 and calculates by subtraction of the two signals the tooth helix error which is in turn recorded by the error recorder 48 as a function of the axial position.

The selector switches 42, 42' and 42'' permit signals to be fed from the sensor 34 directly to the position regulator of whichever drive is required to be made dependent upon another drive, so as to determine before commencing the actual test whether the possible sensor deviation is sufficient for testing the errors or the relative position of the described components, e.g. the position of the sensor carriage 32, requires to be corrected before the test. Thus even test pieces with major errors and/or unknown feed-in and adjustment values can be tested.

We claim:

1. Gear testing machine with drive means for relative movements between a toothed gear to be tested and a sensor connected to an electronic control and evaluation device, said means comprising a rotary drive for relative rotational movements about the axis of the gear, an axial drive for rectilinear relative movements in the direction of the axis of the gear and a tangential drive for relative rectilinear movements in the direction of a tangent to the pitch circle of the gear, each of said drives comprising a servomotor and a tachogenerator providing elements of a closed loop control system, and also a position transducer, the testing machine further comprising an electronic correction circuit which compares with each other the actual position values determined by the position transducers and corrects the test signals emitted by the sensor in conformity with the position errors thereby ascertained, at least one of said drives further comprising a second closed loop control circuit which includes the servomotor of the relevant drive and the associated position transducer and to which actual position values determined by another of the said drives are arranged to be supplied as a regulating variable.

2. Gear testing machine according to claim 1, wherein for tooth profile tests the rotary drive is arranged to be actuated independently of the remaining drives and the actual position values of the rotary drive after multiplication by a factor representative of the pitch circle radius constitute said regulating variable of the second closed loop control circuit in the tangential drive.

3. Gear testing machine according to claim 1 or claim 2, wherein for pitch tests on toothed worms the rotary drive is arranged to be actuated independently of the remaining drives and the actual position values of the rotary drive after multiplication by a factor representative of the pitch of the toothed worm constitute said regulating variable of the second closed loop control circuit in the axial drive.

4. Gear testing machine according to claim 3, wherein for tooth helix angle tests the axial drive is arranged to be actuated independently of the remaining drives and the actual position values of the axial drive after multiplication by a factor representative of the tangent of the tooth helix angle constitute the regulating variable of the second closed loop control system in the rotary drive.

5. Gear testing machine according to claim 4, wherein the rotary drive likewise comprises a second closed loop control system which includes the servomotor of the rotary drive and the associated position transducer.

6. Gear testing machine according to claim 5, wherein each said independently actuated drive is arranged to be actuated by a pulse generator.

* * * * *